US012007966B2

(12) United States Patent
Camble et al.

(10) Patent No.: US 12,007,966 B2
(45) Date of Patent: Jun. 11, 2024

(54) PROVISIONING A DEDUPLICATION DATA STORE

(71) Applicant: HEWLETT PACKARD ENTERPRISE DEVELOPMENT LP, Houston, TX (US)

(72) Inventors: Peter Thomas Camble, Bristol (GB); Andrew Todd, Bristol (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 83 days.

(21) Appl. No.: 17/664,459

(22) Filed: May 23, 2022

(65) Prior Publication Data

US 2023/0376468 A1    Nov. 23, 2023

(51) Int. Cl.
  *G06F 16/215*    (2019.01)
(52) U.S. Cl.
  CPC .................................. *G06F 16/215* (2019.01)
(58) Field of Classification Search
  CPC ..................................................... G06F 16/215
  See application file for complete search history.

(56) References Cited

U.S. PATENT DOCUMENTS

| | | | |
|---|---|---|---|
| 9,336,152 B1 | 5/2016 | Ramamoorthy et al. | |
| 10,235,399 B2 | 3/2019 | Adamson et al. | |
| 10,983,952 B2 * | 4/2021 | Ginzinger | G06F 3/0605 |
| 2015/0085115 A1 * | 3/2015 | Sternberg | H04N 17/004 |
| | | | 348/143 |
| 2021/0240539 A1 | 8/2021 | Murthy et al. | |
| 2021/0397722 A1 * | 12/2021 | Sapuntzakis | G06F 21/6218 |
| 2022/0318206 A1 * | 10/2022 | Prahlad | G06F 3/0631 |

OTHER PUBLICATIONS

Burrows et al., "HPE SimpliVity Sizing and Configuration", Version 1.0, Mar. 2019, 56 pages.
Cloud Storage, "Retention Policies and Retention Policy Locks", available online at <Retention policies and retention policy IoRetention policies and retention policy Io>, Apr. 29, 2022, 7 pages.
IBM; "Estimating internal storage space", Apr. 28, 2022, 3 pages.
VMware Docs, "Sizing Compute and Storage Resources for vRealize Log Insight", May 31, 2019, 8 pages.

* cited by examiner

*Primary Examiner* — Etienne P Leroux
(74) *Attorney, Agent, or Firm* — Trop, Pruner & Hu, P.C.

(57) ABSTRACT

Example implementations relate to provisioning a deduplication data store. An example includes receiving inputs indicating an expected data amount and at least one retention period for the deduplication data store; performing a comparison of the at least one retention period to a stored data structure; determining at least one storage multiplier based on the comparison of the at least one retention period to the stored data structure; and determining an amount of storage to provision for the deduplication data store based on the expected data amount and the at least one storage multiplier.

20 Claims, 7 Drawing Sheets

| Max. Retention | Storage Multiplier |
|---|---|
| 1-7 | 0.9 |
| 8-90 | 1 |
| 91-365 | 1.5 |
| ⋮ | ⋮ |
| >1825 | 5 |

| Inputs 400 |
|---|
| Daily Protected Data |
| Max. Local Retention |
| Max. Remote Retention |

FIG. 4

| Constants 175 | | |
|---|---|---|
| Base RAM | Store Count | Store RAM |
| Data Session RAM | Sparse Index RAM | Backup Window |
| Backup Streams | Min. Back. Streams | Copy Stream |
| Min. Copy Sessions | Sessions/Stream | Remote Metadata |
| Virtual CPU | IOPS | Other Constants |

FIG. 5

PROVISIONING A DEDUPLICATION DATA STORE

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIG. 4 is an illustration of example input parameters, in accordance with some implementations.

FIG. 5 is an illustration of example constant values, in accordance with some implementations.

Figure 1:
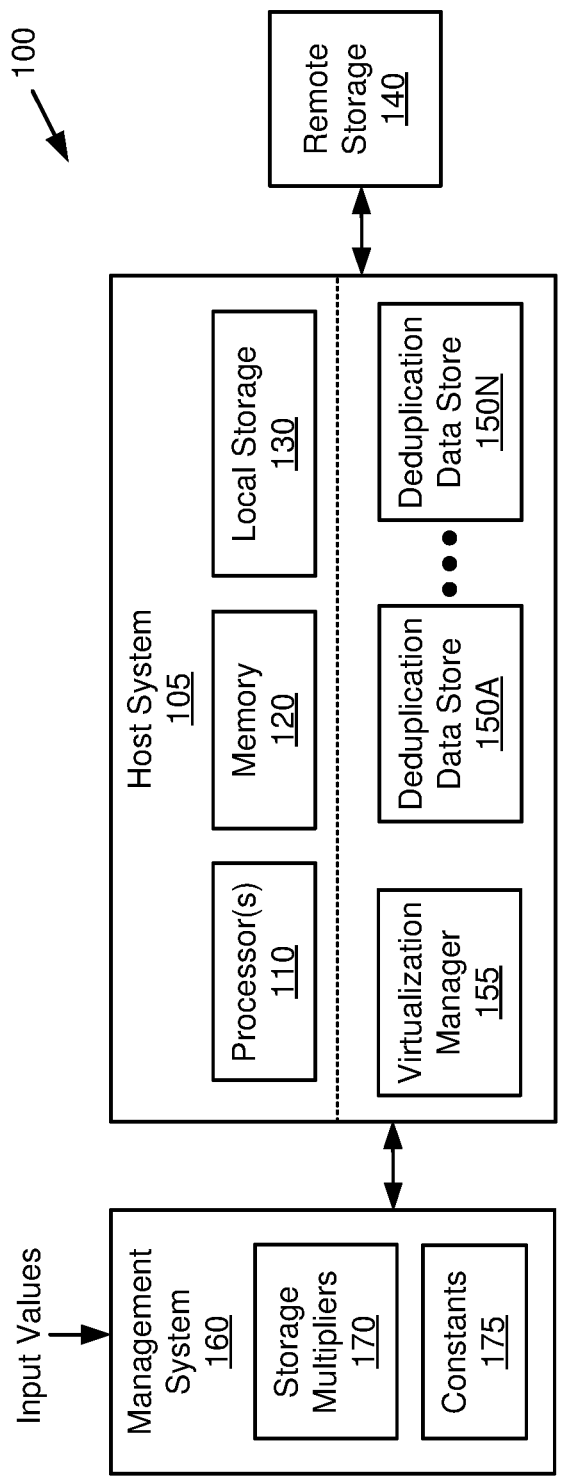
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units or "chunks." Further, the storage system may determine identifiers or "fingerprints" of incoming data units, and may determine which incoming data units are duplicates of previously stored data units. In the case of data units that are duplicates, the storage system may store references to the previous data units instead of storing the duplicate incoming data units.

As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or a plurality of storage devices. A storage system may also include storage controller(s) that manage(s) access of the storage device(s), such as a storage array. A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, data deduplication tasks may be performed by separate storage systems, referred to herein as "deduplication data stores." Each deduplication data store may be implemented as a virtualized system or device that provides an abstraction of a physical storage system, and which includes virtualized components representing the hardware components of the physical storage system. In some examples, a single physical storage system may host multiple virtual deduplication data stores that operate independently of each other. For example, a first virtual deduplication data store may protect (i.e., process and store) backup data for a commercial website, and a second virtual deduplication data store may protect backup data for a company accounting system.

In some examples, the compute resources of the host system may be allocated among one or more deduplication data stores. For example, each deduplication data store may be assigned a particular portion of the host processors, host memory, local host storage, and so forth. However, if a deduplication data store is not allocated sufficient compute resources, that deduplication data store may be incapable of efficiently processing backup data. In such cases, a backup process may execute relatively slowly, and may not be completed before the next backup process is scheduled to run. Further, if the deduplication data store is allocated excessive compute resources, those resources may be wasted. Accordingly, the allocation of excessive resources may result in relatively higher costs, but without providing any additional benefit.

In accordance with some implementations of the present disclosure, a storage management system may determine the amounts of compute resources to be provisioned to a particular deduplication data store. In some implementations, the storage management system may receive inputs including a daily data amount (i.e., the expected amount of data to be protected each day), a maximum local retention period (i.e., the longest amount of time to store data in local storage after initiating protection of that data, e.g., from creation of a backup of that data), and a maximum remote retention period (i.e., the longest amount of time to store data in remote storage after initiating protection of that data, e.g., from creation of a backup of that data). The storage management system may determine a local storage multiplier based on a comparison of the maximum local retention period to a stored data structure, and may then determine the local storage amount based on the local storage multiplier and the daily data mount. The storage management system may also determine a remote storage multiplier based on a comparison of the maximum remote retention period to the stored data structure, and may determine the remote storage amount based on the remote storage multiplier and the daily data mount. The storage management system may then use the remote storage amount to determine an amount of remote metadata to be stored in the local storage. Further, as described below, the storage management system may determine other resource amounts to provision for the deduplication data store, including memory, processor, and storage input/output (I/O) performance (e.g., input/output operations per second (IOPS)). Furthermore, in some implementations, the deduplication data store may be automatically provisioned according to the determined resource amounts. Accordingly, the disclosed technique may provide a deduplication data store having sufficient compute resources to meet a desired performance level, but without resulting in additional costs due to excessive compute resources. In this manner, the disclosed technique may provide an efficient technique for determining appropriate resource amounts for various workloads, which may result in improved performance and efficiency of the deduplication storage system.

FIG. 1—Example Storage System

FIG. 1 shows an example of a storage system 100 that includes a management system 160, a host system 105, and remote storage 140. The host system 105 may include various compute resources, such as processor(s) 110, memory 120, and local storage 130 (e.g., hard drives, flash storage, optical disks, etc.). The processor(s) 110 may include a microprocessor, a microcontroller, a processor module or subsystem, a programmable integrated circuit, a programmable gate array, multiple processors, a microprocessor including multiple processing cores, or another control or computing device. The memory 120 may include dynamic random access memory (DRAM), static random-access memory (SRAM), etc. The local storage 130 and the remote storage 140 may include hard drives, flash storage, optical disks, etc. The remote storage 140 may also be referred to herein as "cloud-based storage."

In some implementations, the host system 105 may include a virtualization manager 155 and any number of deduplication data stores 150A-150N (also referred to herein as "deduplication data stores 150"). The virtualization manager 155 may be a software application executable by the processor(s) 110 to initialize and manage the deduplication data stores 150. For example, the deduplication data stores 150 may be implemented as virtual machines to perform data deduplication, and the virtualization manager 155 may be a hypervisor that manages the deduplication data stores 150. In some implementations, the virtualization manager 155 may manage allocations of the host resources 110, 120, 130 to the deduplication data stores 150. An example implementation of such resource allocations is described below with reference to FIG. 2.

In some implementations, the management system 160 may include functionality to determine or recommend the resource allocations for the deduplication data stores 150. The management system 160 may receive inputs (e.g., via a webpage or other user interface) indicating desired characteristics of a deduplication data store 150 to be provisioned (e.g., on the host system 105 or another system). For example, the received inputs may include a daily data amount, a maximum local retention period, and a maximum remote retention period. The management system 160 may compare the local and remote retention periods to a stored data structure 170 including storage multipliers (e.g., a look-up table), and may thereby determine local and remote storage multipliers. The management system 160 may determine a local storage amount (i.e., a portion of local storage 130) based on the daily data mount and the local storage multiplier. The management system 160 may also determine a remote storage amount (i.e., a portion of remote storage 140) based on the daily data mount and the remote storage multiplier, and may then use the remote storage amount to determine a remote metadata amount to be stored in the local storage 130. Further, in some implementations, the management system 160 may use the constants 175 to determine other resource amounts to provision for the deduplication data store, including memory, processor, and storage input/output (I/O) performance. In some implementations, the virtualization manager 155 may receive this resource information from the management system 160, and may automatically provision the deduplication data store 150 according to the received resource information. This functionality of the management system 160 is described further below with reference to FIGS. 2-9.

In some implementations, the management system 160 may be a computing device including a processor(s), memory, and storage device(s) (not shown in FIG. 1). In such implementations, the storage multiplier data structure 170 and the constants 175 may be stored in a storage device(s) of the management system 160. In other implementations, the management system 160 may be implemented as a network service or function, as a webpage, as an application executed on the host system 105, and so forth.

Figures 2, 3:
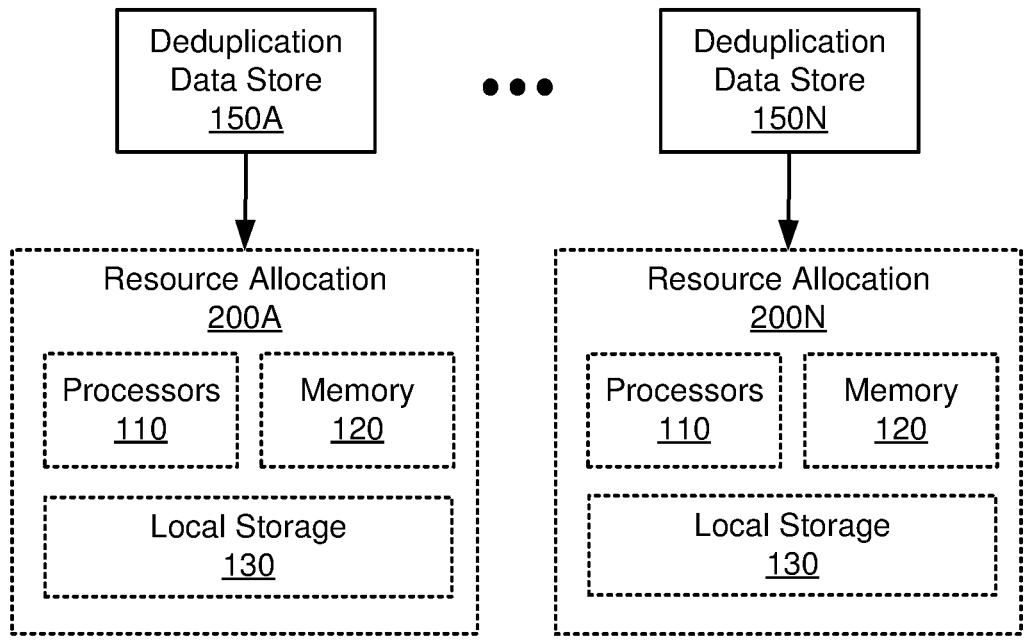
FIG. 2 is an illustration of example resource allocations, in accordance with some implementations.
FIG. 3 is an illustration of an example data structure, in accordance with some implementations.

FIG. 2—Example Resource Allocations

Referring now to FIG. 2, shown is an illustration of example resource allocations 200A-200N (also referred to herein as "resource allocations 200"). As shown, the deduplication data store 150A may be executed using the corresponding resource allocation 200A, and the deduplication data store 150N may be executed using the corresponding resource allocation 200N. Each resource allocation 200 may specify particular amounts or proportions for resources including the processors 110, memory 120, and local storage 130.

In some implementations, the virtualization manager 155 (shown in FIG. 1) may receive or otherwise access the resource allocations 200A-200N, and may automatically provision the deduplication data stores 150A-150N according to the resource allocations 200A-200N. However, in other implementations, the resource allocations 200A-200N may be provided to a user (e.g., a human system manager) as recommendations for selecting system components to be provisioned (e.g., by purchasing computing and storage devices, by leasing cloud services, and so forth).

FIG. 3—Example Data Structure

Referring now to FIG. 3, shown is an illustration of an example storage multiplier data structure 170, in accordance with some implementations. As shown, the data structure 170 may include multiple rows or records, with each row including a different combination of a maximum retention period (e.g., from 1 to 7 days, from 8 to 90 days, etc.) and a storage multiplier.

In some implementations, the data structure 170 may be a table used to look-up storage multipliers corresponding to specified maximum retention periods. For example, the management system 160 may receive an input indicating a maximum local retention period of five days, compare this input to the data structure 170, and thereby determine a local storage multiplier of 0.9 (i.e., as specified in the first row of the data structure 170). In another example, the management system 160 may receive another input indicating a maximum remote retention period of 120 days, compare this input to the data structure 170, and thereby determine a remote storage multiplier of 1.5 (i.e., as specified in the third row of the data structure 170).

In some implementations, the data structure 170 may be populated with the storage multipliers to indicate the average storage requirements that are associated with different maximum retention periods. In some examples, the average storage requirements associated with different maximum retention periods may not change in a simple or linear manner as a function of the maximum retention periods (i.e., there may be a non-linear relationship between the storage multipliers and the maximum retention periods). Instead, the storage requirements may change depending on various retention schemes that are typically used for different retention periods, and which require storage amounts that are not functions of the retention periods. For example, assume that for a maximum retention period of four weeks, the most commonly-used retention scheme may include retaining data once per day in weeks 1-2, and retaining data once per week in weeks 3-4. In another example, for a maximum retention period of six months, the most commonly-used retention scheme may include retaining data once per day in month 1, retaining data once per week in months 2-3, and retaining data twice per month in months 4-6.

Accordingly, in some implementations, the data structure 170 may be populated with the storage multipliers based on expert information and/or empirical information about the storage requirements associated with different maximum retention periods. For example, the expert information may include knowledge of the most commonly-used retention schemes for different maximum retention periods. Further, the empirical information (e.g., system test results, performance measurements generated during actual system use, historical user observations, etc.) may indicate the storage requirements associated with different portions of a given retention scheme. For example, the empirical information may indicate that two consecutive daily backups will typically differ by X percent, that two consecutive weekly backups will typically differ by Y percent, that two consecutive monthly backups will typically differ by Z percent, and so forth. Further, the level of data compressibility (i.e., using deduplication) may vary inversely to the typical amount of change between two consecutive backups. Accordingly, in this manner, expert information (e.g., the most commonly-used retention scheme for a given maximum retention period) and empirical information (e.g., the storage requirements associated with the different portions of the most-commonly used retention scheme) may be used to determine the relative storage requirements that are associated with the corresponding maximum retention periods, and may thereby be used to populate the storage multipliers in the data structure 170. Furthermore, the data structure 170 may allow the storage requirement to be estimated based on a user input of the desired maximum retention period, but without requiring additional user inputs to specify detailed characteristics of the deduplication data store (e.g., retention scheme, data compressibility, and so forth). In this manner, the data structure 170 may reduce the amount of work and complexity for a user when requesting the provision of a deduplication data store.

In some implementations, after a deduplication data store has been provisioned and executed for a given period of time, the management system 160 (shown in FIG. 1) may collect or receive historical information regarding the actual execution of the deduplication data store. Such historical information may include information regarding the actual local and remote storage requirements of the deduplication data store during operation. Accordingly, in some implementations, the data structure 170 may be modified to include updated storage multipliers that reflect the actual performance of the deduplication data store. In such implementations, the management system 160 may use the updated data structure 170 to repeat the process of determining the resource allocations, and to modify or update the provisioning of resources to the deduplication data store. In this manner, the allocation of resources to the deduplication data store may revised according to more accurate information, and may thereby improve the efficiency of resource utilization for the deduplication data store.

Note that, while FIG. 3 illustrates the data structure 170 as a look-up table, other implementations are possible. For example, it is contemplated that the storage multiplier data may be hard-coded as program instructions, may be stored as delimited text files (e.g., as key-value pairs), may be stored as Extensible Markup Language (XML) files, and so forth.

FIG. 4—Example Input Parameters

Referring now to FIG. 4, shown is an illustration of example input parameters 400, in accordance with some implementations. As shown, the input parameters 400 may include a daily data amount, a maximum local retention period, and a maximum remote retention period. The daily data amount may specify the expected amount of data to be protected each day during operation of the deduplication data store (e.g., 1 TB, 150 TB, etc.). The maximum local retention period may specify the maximum time period that any given backup will be retained within the local storage of the deduplication data store (e.g., in an allocated portion of local storage 130 shown in FIG. 1). The maximum remote retention period may specify the maximum time period that any given backup will be retained within the remote storage of the deduplication data store (e.g., in an allocated portion of remote storage 140 shown in FIG. 1).

In some implementations, the input parameters 400 may be associated with a request to provision a new deduplication data store 150 (shown in FIGS. 1-2), and may specify desired characteristics of the requested deduplication data store. The input parameters 400 may be received by the management system 160 (shown in FIG. 1) from a user, control application, operating system, and so forth. For example, the input parameters 400 may be received via a user interface, an application programming interface (API), and so forth. The management system 160 may use the received input parameters 400 to determine the resource allocations 210 (shown in FIG. 2) for the deduplication data stores 150.

FIG. 5—Example Constant Values

Referring now to FIG. 5, shown is an illustration of example constant values 175, in accordance with some implementations. In some implementations, the management system 160 (shown in FIG. 1) may include the constant values 175, and may use the constant values 175 to determine the resource allocations for one or more deduplication data stores.

As shown in FIG. 5, the constant values 175 may include values for Base Random Access Memory (RAM), Store Count, Store RAM, Data Session RAM, Sparse Index RAM, Backup Window, Backup Streams, Minimum Backup Streams, Copy Stream, Minimum Copy Sessions, Sessions/Stream (i.e., Sessions per Stream), Remote Metadata Size, Virtual Central Processing Unit (CPU), Input/Output Instructions per Second (IOPS), and Other Constants.

In some implementations, the Base RAM constant may specify the amount of RAM memory required to run the operating system (OS), backup application, and so forth (e.g., 10 GB). The Store Count constant may specify the expected number of deduplication processes to be executed. The Store RAM constant may specify the amount of RAM memory required for housekeeping in the deduplication data store (e.g., 1 GB). The Data Session RAM constant may specify the amount of RAM memory required to process each backup stream (e.g., 250 MB, 500 MB, etc.). The Sparse Index RAM constant may specify the amount of RAM memory required for a sparse index that represents a given unit of data (e.g., 1 TB) in the deduplication data store. The sparse index may include hashes for a sampled subset of data blocks included in the given unit of data.

In some implementations, the Backup Window constant may specify the time period during which backups are expected to complete (e.g., 8 hours). The Backup Streams constant may specify the minimum number of backup streams required to achieve a given amount of backup throughput (e.g., two streams to achieve a backup throughput of 1 TB/hour). The Minimum Backup Streams constant may specify the minimum number of backup streams that the deduplication data store should support to achieve full parallelism for a single backup (e.g., 16 streams). The Copy Stream constant may specify the minimum number of copy streams required to achieve a given amount of copy throughput (e.g., two streams to achieve a copy throughput of 1 TB/hour). The Minimum Copy Sessions constant may specify the minimum number of copy streams that the deduplication data store should support to achieve full parallelism for a single copy (e.g., 16 streams).

In some implementations, the Sessions per Stream constant may specify the number of backup sessions that each backup stream will open (e.g., two backup sessions). The Remote Metadata Size constant may specify the average size of the metadata held locally for the remote storage data (e.g., 3% of the total remote storage amount). The Virtual CPU constant may specify the number of virtual processors required to achieve a given amount of throughput assuming a particular average core performance (e.g., two virtual processors to achieve a throughput of 1 TB/hour assuming an average core performance of 1.5 GHz). The input/output operations per second (IOPS) value may specify the number of IOPS that the storage device(s) needs to provide in order to achieve a given amount of throughput (e.g., IOPS of 200 to achieve a throughput of 1 TB/hour assuming an average IOP size of 100 KB).

Figure 6:
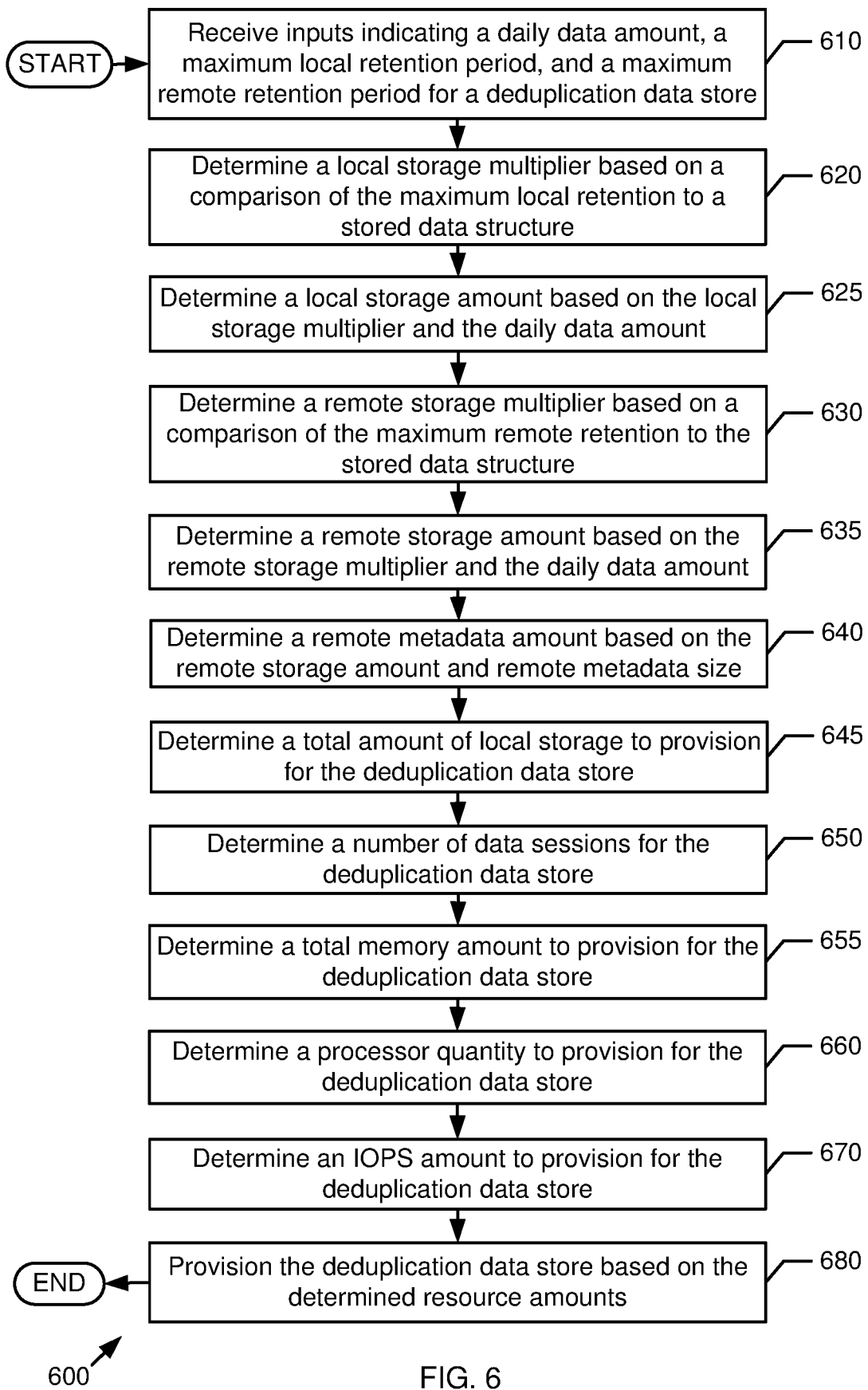
FIG. 6 is an illustration of an example process, in accordance with some implementations.

FIG. 6—Example Process for Provisioning a Deduplication Data Store

Referring now to FIG. 6, shown is an example process 600 for provisioning a deduplication data store, in accordance with some implementations. The process 600 may be performed by the processor(s) 110 (shown in FIG. 1) executing instructions. The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIGS. 1-5, which show examples in accordance with some implementations. However, other implementations are also possible.

Block 610 may include receiving inputs indicating a daily data amount, a maximum local retention period, and a maximum remote retention period for a deduplication data store. For example, referring to FIG. 1, the management system 160 may receive input parameters indicating desired characteristics of a deduplication data store 150 to be provisioned, including a daily data amount, a maximum local retention period, and a maximum remote retention period.

Block 620 may include determining a local storage multiplier based on a comparison of the maximum local retention to a stored data structure. Block 625 may include determining a local storage amount based on the local storage multiplier and the daily data amount. For example, referring to FIG. 1, the management system 160 may compare the maximum local retention period to the stored data structure 170, and may thereby determine a local storage multiplier. The management system 160 may then calculate a local storage amount as a product of the daily data mount times the local storage multiplier. This calculation may be represented by the following formula:

Local Storage=Daily Protected Data*Local Storage Multiplier

Block 630 may include determining a remote storage multiplier based on a comparison of the maximum remote retention to the stored data structure. Block 635 may include determining a remote storage amount based on the remote storage multiplier and the daily data amount. For example, referring to FIG. 1, the management system 160 may compare the maximum remote retention period to the stored data structure 170, and may thereby determine a remote storage multiplier. The management system 160 may then calculate a remote storage amount as a product of the daily data mount times the remote storage multiplier. This calculation may be represented by the following formula:

Remote Storage=Daily Protected Data*Remote Storage Multiplier

Block 640 may include determining a remote metadata amount based on the remote storage amount and the remote metadata size. For example, referring to FIG. 1, the management system 160 may calculate a remote metadata amount as a product of the remote storage amount times the remote metadata size constant (shown in FIG. 5). This calculation may be represented by the following formula:

Remote Metadata=Remote Storage*Remote Metadata Size

Block 645 may include determining a total amount of local storage to provision for the deduplication data store. For example, referring to FIG. 1, the management system 160 may calculate a total amount of local storage as the sum of the local storage amount and the remote metadata amount. This calculation may be represented by the following formula:

Total Storage=Local Storage+Remote Metadata

Block 650 may include determining a number of data sessions for the deduplication data store. For example, referring to FIG. 1, the management system 160 may calculate the number of data sessions using the following four formulas:

Throughput=Daily Protected Data/Backup Window

Backup Streams=Max Of((Throughput*Backup Streams),(Min. Backup Streams))

Copy Streams=Max Of((Throughput*Copy Streams), (Min. Copy Streams))

Number of Sessions=(Backup Streams+Copy Streams)*(Sessions/Stream)

Block 655 may include determining a total memory amount to provision for the deduplication data store. For example, referring to FIG. 1, the management system 160 may calculate the total memory to provision using the following four formulas:

Stores RAM=Store Count*Store RAM

Sessions RAM=Number of Sessions*Data Session RAM

Storage RAM=(Local Storage+Remote Storage) *Sparse Index RAM

Total Memory=Base RAM+Stores RAM+Sessions RAM+Storage RAM

Block 660 may include determining a processor quantity to provision for the deduplication data store. For example, referring to FIG. 1, the management system 160 may calculate the processor quantity as the product of the throughput times the virtual CPU constant (shown in FIG. 5). This calculation may be represented by the following formula:

Processor Quantity=Throughput*Virtual CPU

Block 670 may include determining an input/output operations per second (IOPS) quantity to provision for the deduplication data store. For example, referring to FIG. 1, the management system 160 may calculate the IOPS quantity as the product of the throughput times the IOPS constant (shown in FIG. 5). This calculation may be represented by the following formula:

IOPS Quantity=Throughput*IOPS

Block 680 may include provisioning the deduplication data store based on the determined resource amounts. For example, referring to FIG. 1, the virtualization manager 155 may receive the determined resource amounts from the management system 160, and may automatically provision the deduplication data store 150 according to these resource amounts. After block 680, the process 600 may be completed.

In some implementations, after the process 600 has been performed to provision the deduplication data store, the management system 160 (shown in FIG. 1) may collect or receive historical information regarding the actual execution of the deduplication data store. Further, the management system 160 may update the data structure 170 to include new storage multipliers that reflect the actual performance of the deduplication data store. In such implementations, the management system 160 may repeat the process 600 using the updated data structure 170, and may thereby modify or re-provision the resources allocated to the deduplication data store. In this manner, the process 600 may be repeated to improve the efficiency of resource utilization for the deduplication data store.

Figure 7:
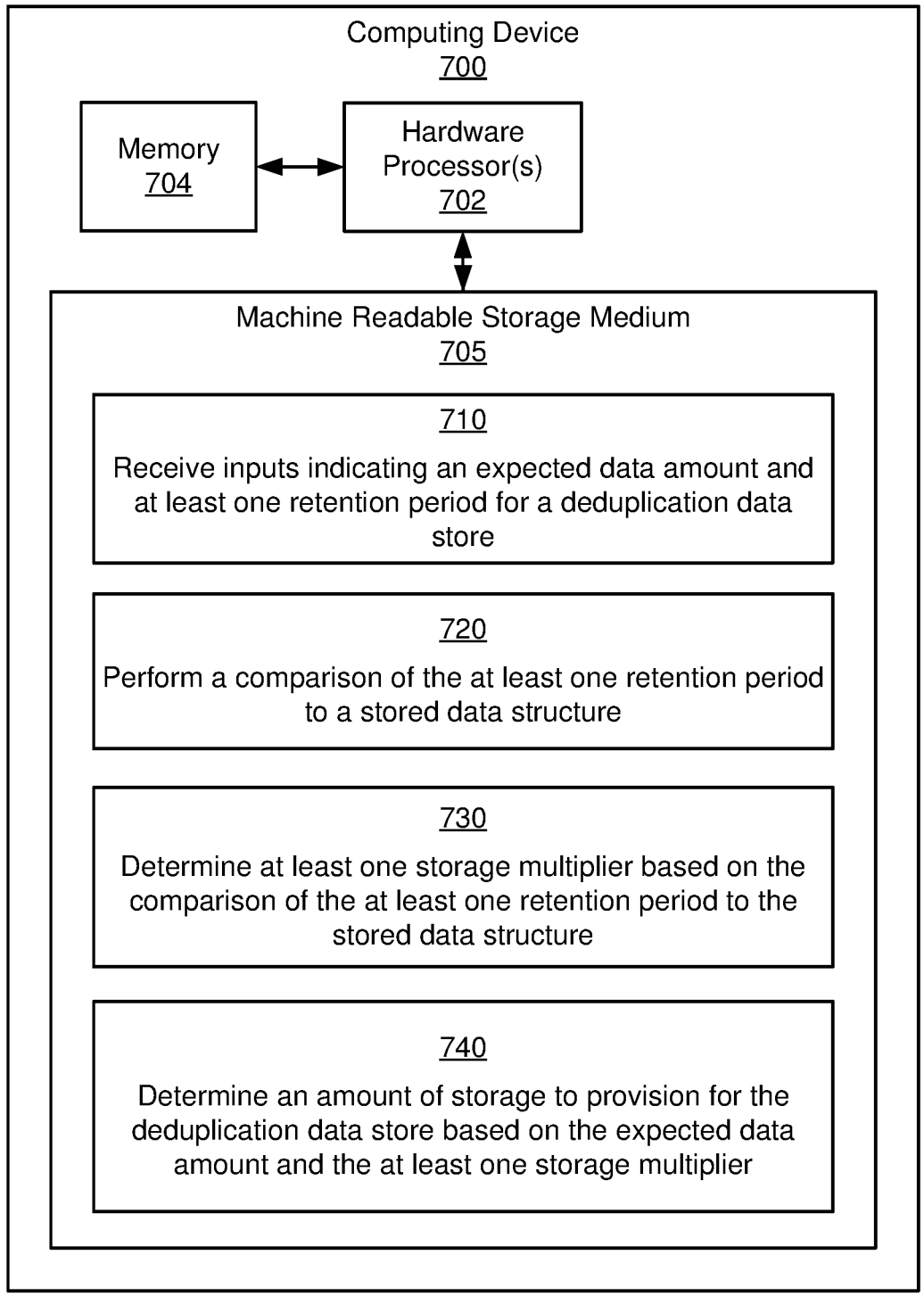
FIG. 7 is a schematic diagram of an example computing device, in accordance with some implementations.

FIG. 7—Example Computing Device

FIG. 7 shows a schematic diagram of an example computing device 700. In some examples, the computing device 700 may correspond generally to some or all of the management system 160 (shown in FIG. 1). As shown, the computing device 700 may include a hardware processor 702, a memory 704, and machine-readable storage 705 including instructions 710-740. The machine-readable storage 705 may be a non-transitory medium. The instructions 710-740 may be executed by the hardware processor 702, or by a processing engine included in hardware processor 702.

Instruction 710 may be executed to receive inputs indicating an expected data amount and at least one retention period for a deduplication data store. For example, referring to FIG. 1, the management system 160 may receive input parameters indicating desired characteristics of a deduplication data store 150 to be provisioned, including a daily data amount, a maximum local retention period, and a maximum remote retention period.

Instruction 720 may be executed to perform a comparison of the at least one retention period to a stored data structure. Instruction 730 may be executed to determine at least one storage multiplier based on the comparison of the at least one retention period to the stored data structure. For example, referring to FIG. 1, the management system 160 may compare the maximum local retention period to the stored data structure 170, and may thereby determine a local storage multiplier. In another example, the management system 160 may compare the maximum remote retention period to the stored data structure 170, and may thereby determine a remote storage multiplier.

Instruction 740 may be executed to determine an amount of storage to provision for the deduplication data store based on the expected data amount and the at least one storage multiplier. For example, referring to FIG. 1, the management system 160 may calculate a local storage amount as a product of the daily data mount times the local storage multiplier.

Figure 8:
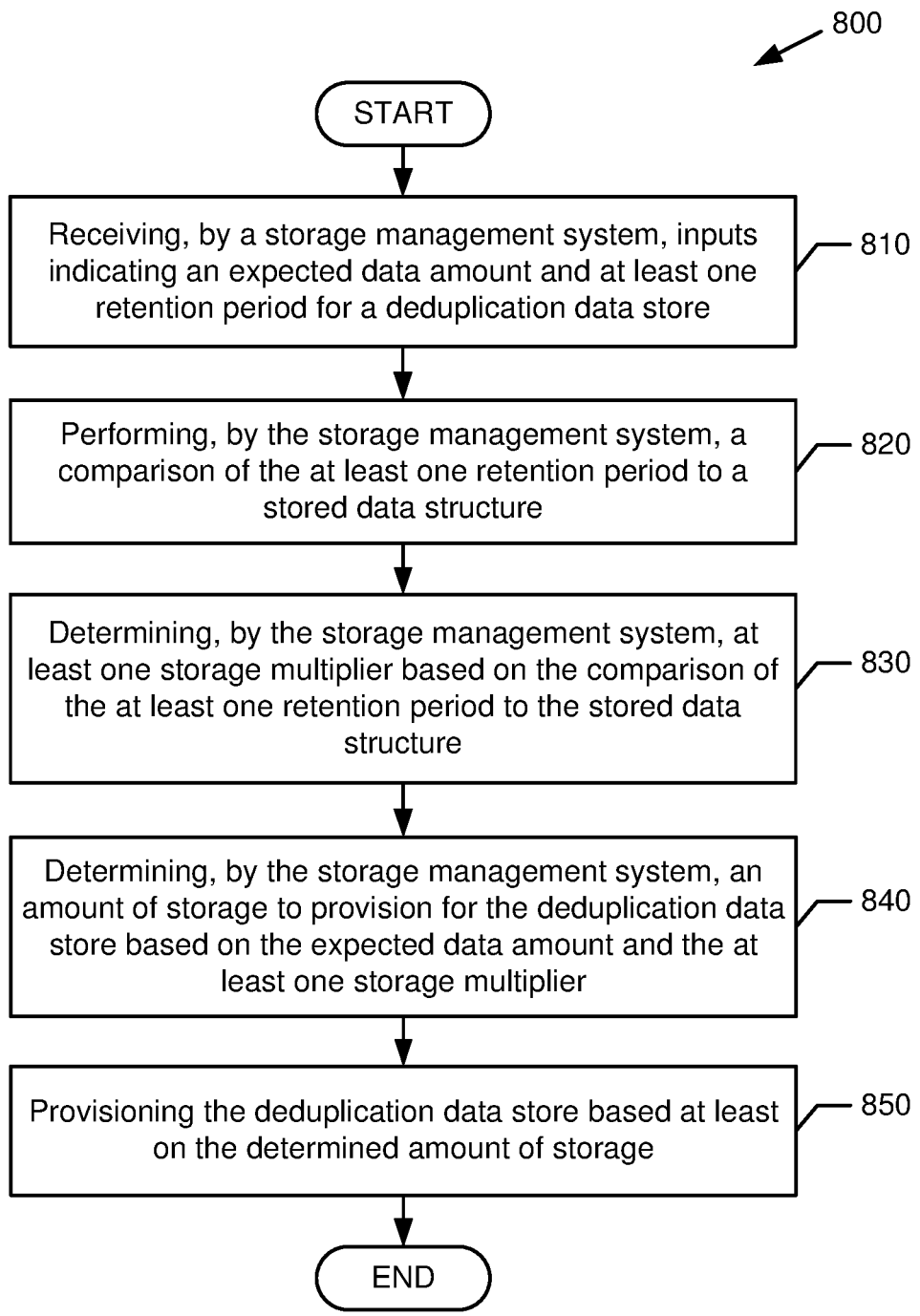
FIG. 8 is an illustration of an example process, in accordance with some implementations.

FIG. 8—Example Process

Referring now to FIG. 8, shown is an example process 800 in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1-3, which show examples in accordance with some implementations. However, other implementations are also possible.

Block 810 may include receiving, by a storage management system, inputs indicating an expected data amount and at least one retention period for a deduplication data store. Block 820 may include performing, by the storage management system, a comparison of the at least one retention period to a stored data structure. Block 830 may include determining, by the storage management system, at least one storage multiplier based on the comparison of the at least one retention period to the stored data structure. Block 840 may include determining, by the storage management system, an amount of storage to provision for the deduplication data store based on the expected data amount and the at least one storage multiplier. Block 850 may include provisioning the deduplication data store based at least on the determined amount of storage. After block 850, the process 800 may be completed.

Figure 9:
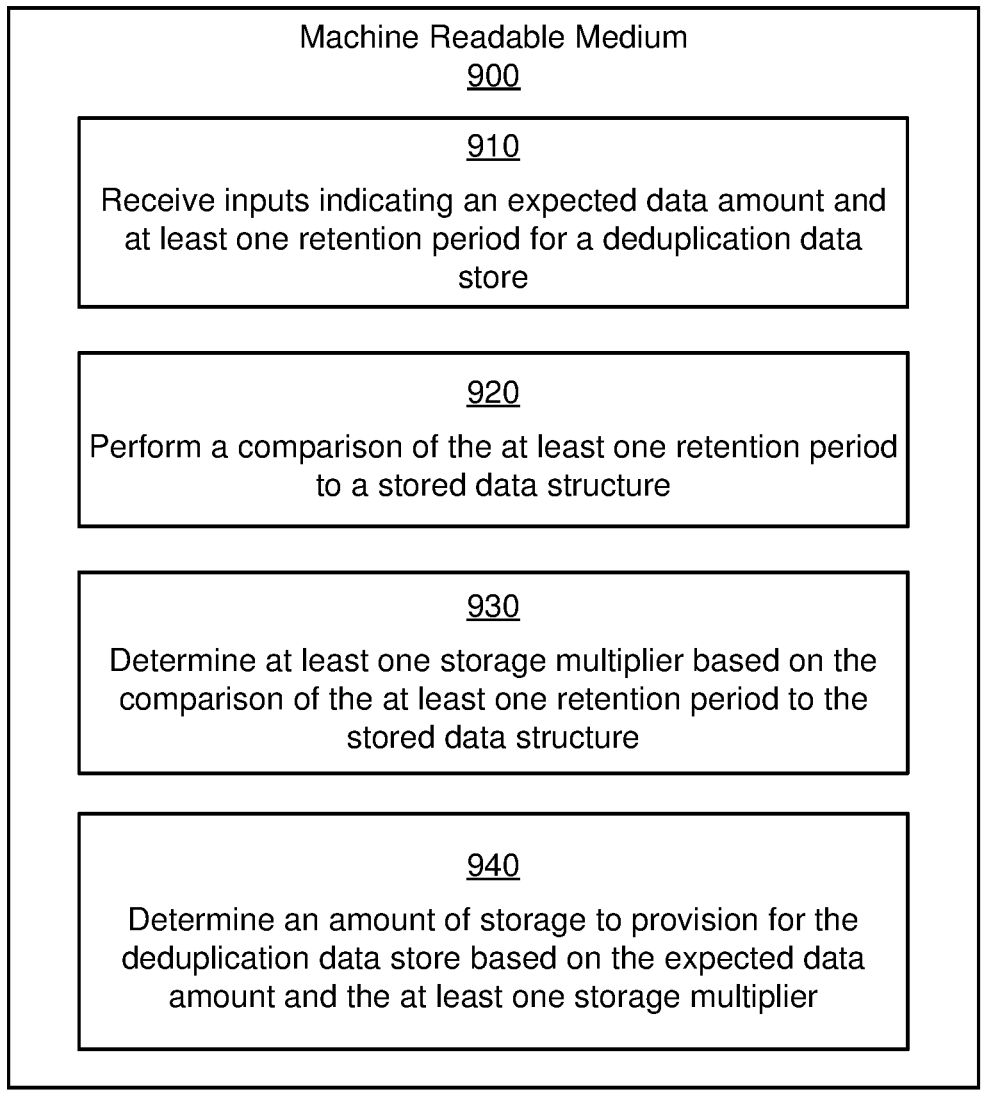
FIG. 9 is a diagram of an example machine-readable medium storing instructions in accordance with some implementations.

FIG. 9—Example Machine-Readable Medium

FIG. 9 shows a machine-readable medium 900 storing instructions 910-940, in accordance with some implementations. The instructions 910-940 can be executed by a single processor, multiple processors, a single processing engine, multiple processing engines, and so forth. The machine-readable medium 900 may be a non-transitory storage medium, such as an optical, semiconductor, or magnetic storage medium.

Instruction 910 may be executed to receive inputs indicating an expected data amount and at least one retention period for a deduplication data store. For example, referring to FIG. 1, the management system 160 may receive input parameters indicating desired characteristics of a deduplication data store 150 to be provisioned, including a daily data amount, a maximum local retention period, and a maximum remote retention period.

Instruction 920 may be executed to perform a comparison of the at least one retention period to a stored data structure. Instruction 930 may be executed to determine at least one storage multiplier based on the comparison of the at least one retention period to the stored data structure. For example, referring to FIG. 1, the management system 160 may compare the maximum local retention period to the stored data structure 170, and may thereby determine a local storage multiplier. In another example, the management system 160 may compare the maximum remote retention period to the stored data structure 170, and may thereby determine a remote storage multiplier.

Instruction 940 may be executed to determine an amount of storage to provision for the deduplication data store based on the expected data amount and the at least one storage multiplier. For example, referring to FIG. 1, the management system 160 may calculate a local storage amount as a product of the daily data mount times the local storage multiplier.

In accordance with implementations described herein, a storage management system may determine the amounts of compute resources to be provisioned to a particular deduplication data store. In some implementations, the storage management system may receive inputs including a daily data amount, a maximum local retention period, and a maximum remote retention period. The storage management system may determine a local storage multiplier based on a comparison of the maximum local retention period to a stored data structure, and may then determine the local storage amount based on the local storage multiplier and the daily data mount. The storage management system may also determine a remote storage multiplier based on a comparison of the maximum remote retention period to the stored data structure, and may determine the remote storage amount based on the remote storage multiplier and the daily data mount. The storage management system may use the remote storage amount to determine an amount of remote metadata to be stored in the local storage. Further, the storage management system may determine other resource amounts to provision for the deduplication data store, including memory, processor, and storage I/O performance. In some implementations, the deduplication data store may be automatically provisioned according to the determined resource amounts. Accordingly, the disclosed technique may provide a deduplication data store having sufficient compute resources to meet a desired performance level, but without resulting in additional costs due to excessive compute resources. In this manner, the disclosed technique may provide improved performance and efficiency of the deduplication storage system.

Note that, while FIGS. 1-9 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the management system 160 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a processor;
a memory; and
a machine-readable storage storing instructions, the instructions executable by the processor to:
receive inputs indicating an expected data amount and at least one retention period for a deduplication data store;
perform a comparison of the at least one retention period to a stored data structure, wherein the stored data structure comprises different combinations of respective storage multipliers corresponding to respective maximum retention periods;
determine at least one storage multiplier of the respective storage multipliers based on the comparison of the at least one retention period to the stored data structure; and
determine an amount of storage to provision for the deduplication data store based on the expected data amount and the determined at least one storage multiplier.

2. The system of claim 1, including instructions executable by the processor to:
provision the deduplication data store based at least on the determined amount of storage.

3. The system of claim 1, wherein the stored data structure is populated with the storage multipliers based on expert knowledge regarding a first retention scheme most commonly-used for a particular maximum retention period.

4. The system of claim 3, wherein the stored data structure is populated with the storage multipliers further based on empirical information regarding storage requirements associated with different portions of the first retention scheme.

5. The system of claim 1, including instructions executable by the processor to:
determine a local storage multiplier based on a comparison of a maximum local retention period to the stored data structure; and
determine a local storage amount based on the local storage multiplier and the expected data amount.

6. The system of claim 5, including instructions executable by the processor to:
determine a remote storage multiplier based on a comparison of the maximum remote retention period to the stored data structure;
determine a remote storage amount based on the remote storage multiplier and the expected data amount;
determine a remote metadata amount based on the remote storage amount and the remote metadata size; and
determine a total amount of local storage to provision based on the local storage amount and the remote metadata amount.

7. The system of claim 1, including instructions executable by the processor to:
determine a number of data sessions for the deduplication data store;
determine a total memory amount to provision for the deduplication data store;
determine a processor quantity to provision for the deduplication data store; and
determine an input/output operations per second (IOPS) quantity to provision for the deduplication data store.

8. The system of claim 1, wherein the amount of storage to provision is yielded based on a product of one of the determined at least one storage multiplier and the expected data amount, wherein the expected data amount comprises an expected amount of data to be protected on a periodic basis.

9. A method comprising:
receiving, by a storage management system, inputs indicating an expected data amount and at least one retention period for a deduplication data store;
performing, by the storage management system, a comparison of the at least one retention period to a stored data structure, wherein the stored data structure comprises different combinations of respective storage multipliers corresponding to respective maximum retention periods;
determining, by the storage management system, at least one storage multiplier of respective storage multipliers based on the comparison of the at least one retention period to the stored data structure; and
determining, by the storage management system, an amount of storage to provision for the deduplication data store based on the expected data amount and the determined at least one storage multiplier.

10. The method of claim 9, further comprising:
provisioning the deduplication data store based at least on the determined amount of storage.

11. The method of claim 9, further comprising:
populating the storage multipliers into the stored data structure based on:
expert knowledge regarding a first retention scheme most commonly-used for a particular maximum retention period, and
empirical information regarding storage requirements associated with different portions of the first retention scheme.

12. The method of claim 9, further comprising:
determining a local storage multiplier based on a comparison of the maximum local retention period to the stored data structure; and
determining a local storage amount based on the local storage multiplier and the expected data amount.

13. The method of claim 12, further comprising:
determining a remote storage multiplier based on a comparison of the maximum remote retention period to the stored data structure;
determining a remote storage amount based on the remote storage multiplier and the expected data amount;
determining a remote metadata amount based on the remote storage amount and the remote metadata size; and
determining a total amount of local storage to provision based on the local storage amount and the remote metadata amount.

14. The method of claim 9, further comprising:
determining a number of data sessions for the deduplication data store;
determining a total memory amount to provision for the deduplication data store;
determining a processor quantity to provision for the deduplication data store; and
determining an input/output operations per second (IOPS) quantity to provision for the deduplication data store.

15. The method of claim 9, wherein the amount of storage to provision is yielded based on a product of one of the determined at least one storage multiplier and the expected data amount, wherein the expected data amount comprises an expected amount of data to be protected on a periodic basis.

16. A non-transitory machine-readable medium storing instructions that upon execution cause a processor to:
- receive inputs indicating an expected data amount and at least one retention period for a deduplication data store;
- perform a comparison of the at least one retention period to a stored data structure, wherein the stored data structure comprises different combinations of respective storage multipliers corresponding to respective maximum retention periods;
- determine at least one storage multiplier of the respective storage multipliers based on the comparison of the at least one retention period to the stored data structure; and
- determine an amount of storage to provision for the deduplication data store based on the expected data amount and the determined at least one storage multiplier.

17. The non-transitory machine-readable medium of claim 16, including instructions that upon execution cause the processor to:
- provision the deduplication data store based at least on the determined amount of storage.

18. The non-transitory machine-readable medium of claim 16,
- wherein the stored data structure is populated with the storage multipliers based on:
  - expert knowledge regarding a first retention scheme most commonly-used for a particular maximum retention period;
  - empirical information regarding storage requirements associated with different portions of the first retention scheme.

19. The non-transitory machine-readable medium of claim 16, including instructions that upon execution cause the processor to:
- determine a local storage multiplier based on a comparison of the maximum local retention period to the stored data structure; and
- determine a local storage amount based on the local storage multiplier and the expected data amount.

20. The non-transitory machine-readable medium of claim 19, including instructions that upon execution cause the processor to:
- determine a remote storage multiplier based on a comparison of the maximum remote retention period to the stored data structure;
- determine a remote storage amount based on the remote storage multiplier and the expected data amount;
- determine a remote metadata amount based on the remote storage amount and the remote metadata size; and
- determine a total amount of local storage to provision based on the local storage amount and the remote metadata amount.

\* \* \* \* \*